United States Patent
Storch et al.

(10) Patent No.: US 6,669,370 B1
(45) Date of Patent: Dec. 30, 2003

(54) PLAIN BEARING

(75) Inventors: Thomas Storch, Bruhl (DE); Wolfgang Bickle, Reilingen (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 54 days.

(21) Appl. No.: 10/088,817

(22) PCT Filed: Aug. 28, 2000

(86) PCT No.: PCT/EP00/08368

§ 371 (c)(1),
(2), (4) Date: Jun. 24, 2002

(87) PCT Pub. No.: WO01/21968

PCT Pub. Date: Mar. 29, 2001

(30) Foreign Application Priority Data

Sep. 22, 1999  (DE) .......................................... 199 45 371

(51) Int. Cl.[7] ............................................. F16C 33/02
(52) U.S. Cl. ...................................... 384/129; 384/296
(58) Field of Search ................................ 384/129, 275, 384/276, 279, 295, 296; 29/898.04, 898.041, 898.042, 898.054, 898.056

(56) References Cited

U.S. PATENT DOCUMENTS

| | | | | |
|---|---|---|---|---|
| 3,445,147 A | * | 5/1969 | Neimi | 384/420 |
| 4,435,100 A | * | 3/1984 | Cox | 403/27 |
| 4,582,435 A | | 4/1986 | Davis | 384/129 |
| 4,796,457 A | | 1/1989 | Iijima | 72/370 |
| 5,385,422 A | | 1/1995 | Kruger | 403/371 |
| 5,593,233 A | * | 1/1997 | Kammel et al. | 384/222 |

FOREIGN PATENT DOCUMENTS

| | | |
|---|---|---|
| DE | 33 08 113 | 9/1984 |
| DE | 194 46 777 | 5/1998 |
| DE | 197 19 129 | 6/1998 |
| JP | 07 317771 | 12/1995 |
| WO | WO98/28105 | 7/1998 |

* cited by examiner

Primary Examiner—Thomas R. Hannon
(74) Attorney, Agent, or Firm—Young & Basile, PC

(57) ABSTRACT

A hinge housing has a flange bearing bush pressed into a transverse bearing opening. A bearing pin is swively inserted in the flange bearing bush. The plain bearing is a ready-to-install unit in that the cylindrical bush part of the flange bearing bush inserted in the bearing opening is deformed radially outwards and radially inwards by axially upsetting the front face and rests on the inner wall of the bearing opening and against the circumferential surface of the bearing pin without play. The front face is recessed behind the surface of the hinge housing part. One side of the plain bearing has an axial bearing element that exteriorly rests radially against the surface area of the hinge housing part surrounding the bearing opening and radially interiorly against an axial step of the bearing pin. The bearing pin is secured in a position in the axial direction.

15 Claims, 3 Drawing Sheets

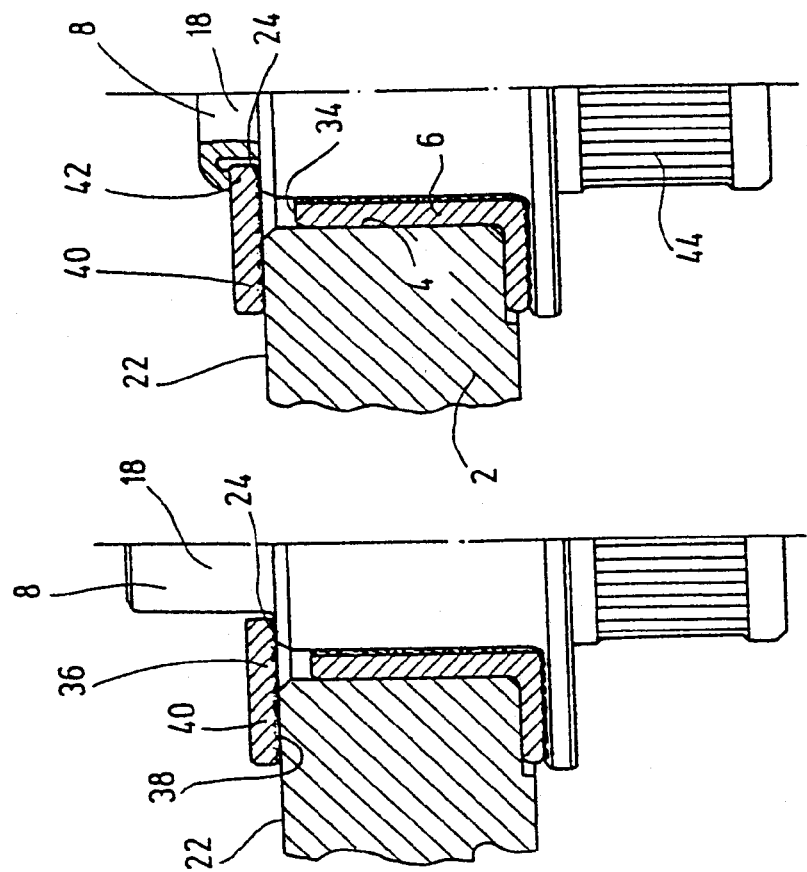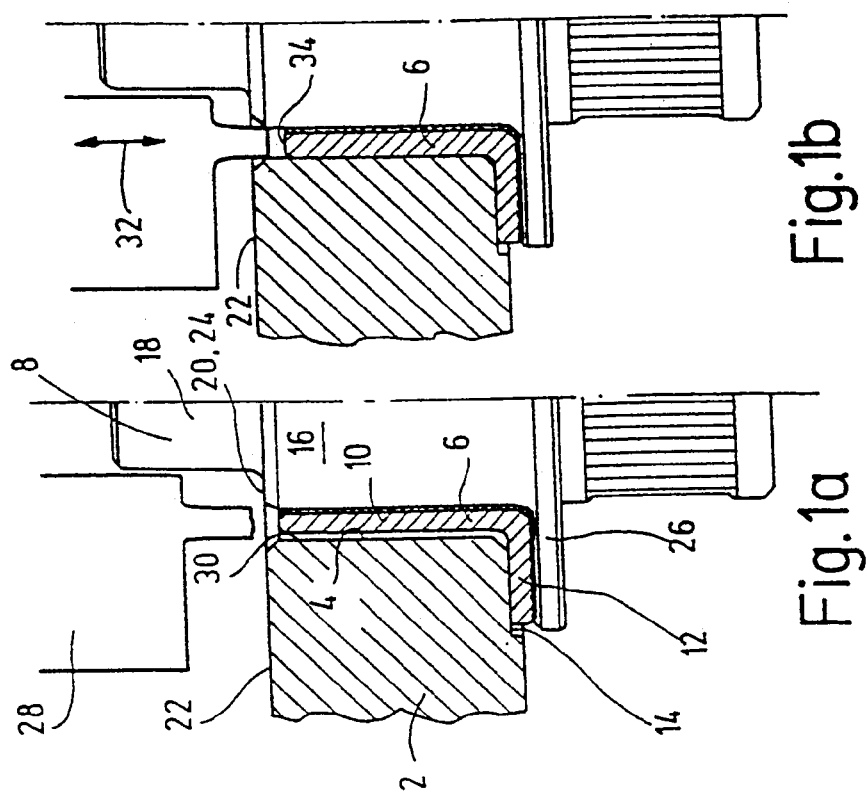

PLAIN BEARING

BACKGROUND

The invention relates to a plain bearing comprising a hinge housing having a through bearing opening and a flange bearing bashing pressed into the bearing opening, into which a bearing pin is inserted and is received so as to be swivelled. The term chosen above for the hinge housing is to be understood in abroad sense. It can refer to a hinge arm or to part of a sidewall which is fixed, or attached to a piece of equipment and in which a bearing opening is formed.

During the manufacture and assembly of plain bearings, particularly during assembly line production in the automotive area, for example during the assembly of hinged components such as doors deck lids or hoods, it is advantageous if the number of assembly steps can be reduced as much as possible. Preferably pre-assembled components should be used in order to make assembly on the line more efficient.

The object of the present invention is therefore to create a plain bearing of the type named at the beginning which takes this aspect into consideration.

SUMMARY

This object is accomplished by a plain bearing which is characterized in that the cylindrical bushing of the flange bearing bushing is deformed radially outward and radially inward by axially upsetting the end face, contacts the inner wall of the bearing opening without play, and contacts the peripheral surface of the bearing pin without play, and in that the end face of the cylindrical bushing of the flange bearing bushing is recessed below the surfaces area of the hinge housing surrounding the bearing opening, and in that on the side of the plain bearing opposite the collar of the flange bearing bushing a washer-shaped axial bearing is provided which contacts the surface area surrounding the bearing opening radially on the outside and an axial step on the bearing pin radially on the inside, and in that the bearing pin is securely captured in the axial direction against the axial bearing element.

In the case of a non-conventional plain bearing under DE 196 46 777 A1 having a bearing opening in a housing and a collarless rolled cylindrical plain bearing bushing inserted into it, the process is known of axially upsetting the opposite faces of the cylindrical bushing to locate the bushing in the bearing opening without play; but it was not possible to obtain a pre-assembled unit made up of the housing section, bushing and bearing pin.

Under the invention, a plain bearing consisting of hinge housing, bushing and pin is created which can be manufactured, shipped, warehoused and finally brought to assembly on the line as a pre-assembled unit. The flange bearing bushing is pressed into the bearing opening in the hinge housing as a press fit, and the bearing pin is captured securely in the flange bearing bushing opening by working in conjunction with the axial bearing. Preferably the pin includes a collar or flange section which in turn contacts the collar on the flange bearing bushing and thus also secures it.

From DE 296 22 973 U a non-conventional plain bearing is known in which a deep-drawn barrel-shaped housing receives a collarless rolled bushing. After inserting a bearing pin into the opening, the readily accessible front face of the bearing bushing is upset, and the bushing is thereby deformed radially outward and radially inward. The pin is secured against falling out by a cap. In turn, the assembly thus obtained has to be positioned in an opening of a hinge housing. Consequently, additional assembly steps are required. In addition, the complexity of the parts is greater than in the case of the inventive bearing and therefore more expensive.

In a further development of the inventive concept, the section of the bearing pin extending through the axial bearing element is deformed radially outward and clinches the radial inside edge of the axial bearing. The pin is thereby captured in the bearing opening. It is evident that the bearing pin can be securely retained in position against the axial bearing in an axial direction using a different method. For example, the axial bearing element could be configured as two parts and engage annular grooves or other undercuts in the bearing pin shaft. The axial bearing element could have spring clips or the like projecting radially inward, which can engage undercuts, or other assembly elements could be employed. By contrast, deforming the front face of the bearing pin proves to be advantageous because it is simple to manufacture.

The bearing pin could have a recess on the end face so that it can be connected to another hinge housing by other assembly parts engaging with it to form a linkage. In contrast, it proves advantageous if the bearing pin has an anchoring section at one end by which it can be connected to another hinge housing to form a linkage. Preferably the bearing pin is connected in a rotationally immovable manner with the other hinge housing section.

In a particularly advantageous further development of the invention the cylindrical bushing in the flange bearing bushing is deformed by axially upsetting its front face radially outward and radially inward against the inner wall of the bearing opening and against the outside surface of the bearing pin in such a way that a breakloose torque between 0.5 and 4.0 Nm results for the plain bearing, preferably between 0.5 and 2.5 Nm. The breakloose torque is preferably always more than 1 Nm higher than the resulting torque for the plain bearing after breaking loose.

Independent inventive significance attaches to the previous idea, even separately from the previously described configuration of the plain bearing. It was determined that, by deforming the bushing to a greater or lesser degree, which can be controlled by the application of force against the end face of the cylindrical bushing in the flange bearing bushing, the torque required to pivot the plain bearing can be preset, where, as previously mentioned, a distinction is made between the breakloose torque for the plain bearing and a subsequently resulting torque, somewhat comparable to static friction and the resulting sliding friction between two objects.

Special significance attaches to the invention in particular measure in the production of plain bearings for vehicle linkages, and even more particularly in the production and assembly of vehicle door hinges. On the one hand, a torque should be reached with vehicle doors which is experienced by the user as not too tight and thus comfortable to operate. On the other hand, it should be ensured that in the course of assembling the vehicle, particularly considering that the bodies pass through a paint station, the vehicle doors remain in a partially open position. Since the bodies on assembly lines are often taken up and down on inclined planes there is a danger that the open vehicle doors will close by themselves or open too far as the body moves downward.

For the first time, this problem could be countered with the present invention by creating a plain bearing in which the breakloose torque as well as the subsequently resulting torque of the resulting linkage can be adjusted by means of axially upsetting the face of the plain bearing bushing to a greater or lesser degree.

It has been proved to be expedient that with a bearing pin diameter between 5 and 20 mm the diameter of the bearing openings in the hinge housing is between 2 and 2.5 mm larger than the bearing pin diameter. Thus, a radial clearance of between 1 and 1.25 mm results in which the cylindrical part of the flange bearing bushing engages. The torque can be set by axially upsetting the front face of the cylindrical bushing. The force to produce a desired tightness in the form of a desired torque depends on the size of the face on which force is exerted by using an upsetting sleeve. Small changes in the size of the clearance, which advantageously essentially matches the thickness of the upsetting sleeve, produce divergent results. However the required range of force to produce a specific torque range can be determined through simple experiments, by performing several deformation tests with different applications of force with a preset geometry for the plain bearing and measuring the resulting torques. By means of simple analysis on a graph the preferred range can be determined.

BRIEF DESCRIPTION OF THE DRAWING

Additional features, details and advantages of the invention can be derived from the attached patent claims and from the graphical presentation and subsequent description of a preferred embodiment of the plain bearing in accordance with the invention and from the presentation of several measurements in the form of graphs. In the drawing:

FIGS. 1a to 1d are partial views of different manufacturing steps for the plain bearing under the invention;

DETAILED DESCRIPTION

Figure 2:
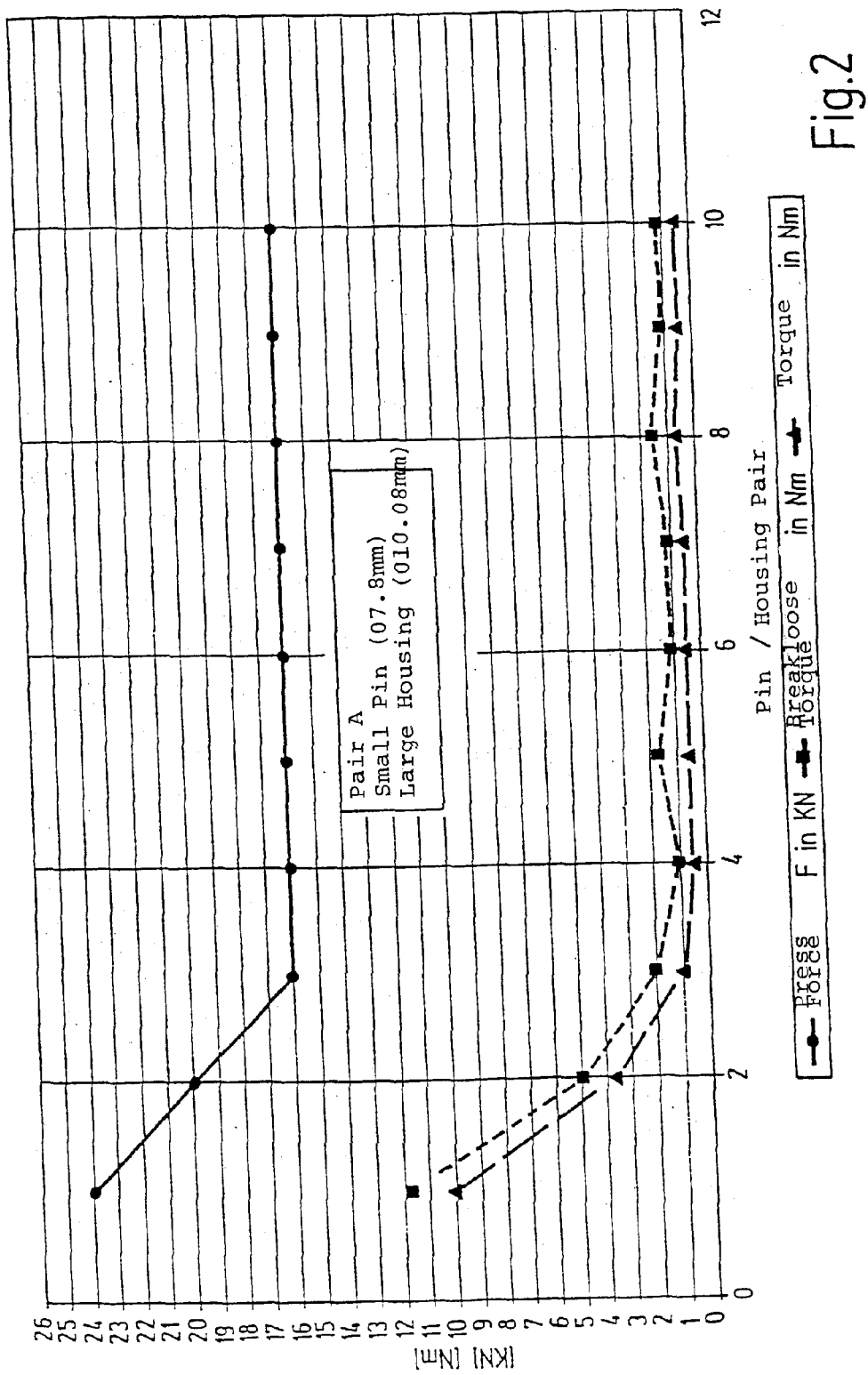
FIG. 2 is a graph of breakloose torque or the resulting torque dependent on the deformation force in the manufacture of the plain bearing.

FIGS. 1a–1d show different steps in the manufacture of a plain bearing under the invention. The plain bearing comprises a hinge housing 2 with a bearing opening 4 manufactured as a cylindrical bore and a flange bearing bushing 6 pressed into the bearing opening 4. A bearing pin 8 is inserted into the flange bearing bushing 6. The flange bearing bushing 6 comprises a cylindrical part 10 and the collar 12, which lies against a surface area 14 of the hinge housing 2 immediately surrounding the bearing opening 4. The bearing pin 8 comprises a first cylindrical section 16 which is larger in diameter and a second cylindrical section 18 which is smaller in diameter. An axial step 20 is formed in the transition between sections 16 and 18, with a contact surface 24 running parallel to the flange plane of the flange bearing bushing 6 or parallel to a surface 22 of the hinge housing 2. The bearing pin 8 comprises in addition a radially projecting flange-shaped section 26, which lies against the collar 12 of the flange bearing bushing 6 and secures the latter in its final assembled state against falling out.

The transition between the larger diameter section 16 and the smaller diameter section 18 of the bearing pin 8 is selected in such a way that the contact surface 24 runs in the surface plane 22 of the hinge housing 2. Starting with the position shown in FIG. 1a, a press tool 28 with a geometry matching the clearance 30 between the wall of the bearing opening 4 and the outer surface of the larger diameter section 16 of the bearing pin 8 is brought in and, as can be seen from FIG. 1b, moved into the clearance in an axial direction 32. The press tool 28 upsets the axial front face 34 of the flange bearing bushing 6 and deforms it radially outward and radially inward. In this way the flange bearing bushing is seated without play against the wall of the bearing opening 4 and against the outside surface of the larger diameter section 16 of the bearing pin 8. After upsetting, the front face 34 is recessed in an axial direction with respect to the surface 22 of the hinge housing 2. Now, as shown in FIG. 1c, a washer-shaped axial bearing 36 of a steel/plastic composite material can be turned over the smaller diameter section of the pin and seated on the one hand against the surface 22 of the hinge housing 2 and on the other hand against the contact surface 24 of the bearing pin 8. The axial bearing comprises a plastic contact surface 38, which is made from a PTFE-based plastic contact layer applied to a porous surface which is preferably made up of a porous bronze layer sintered onto a steel back 40. The flange bearing bushing is manufactured in the same way.

In a further assembly step seen in FIG. 1d, the smaller diameter section 18 of the bearing pin 8 is deformed radially outward. As a result of this step, the radial inner edge 42 of the axial bearing 40 is clinched. The bearing pin 8 is now retained securely in the bearing opening.

The bearing pin 8 includes an anchor section 44 on its opposite side by which it can be connected to another hinge housing, which is not shown.

FIG. 2 shows the characteristics of the breakloose torque or the torque respectively, depending on the calibration force, of a plain bearing which is formed by pairing a bearing pin having an outside diameter inside the flange bearing bushing of 7.8 mm with a bearing opening in the hinge housing having a diameter of 10.08 mm. Ten different plain bearings were produced, where the axial end face inside the clearance between bearing opening and bearing pin was upset with a force of 24 kN (1), 20 kN (2) and 16 kN (3–10). The result is a breakloose torque or a subsequently resulting torque which can be seen from the graph. The graph shows that with a deformation force of about 16 kN a breakloose torque or torque in the range of 0.5–2 Nm is achieved.

Figure 3:
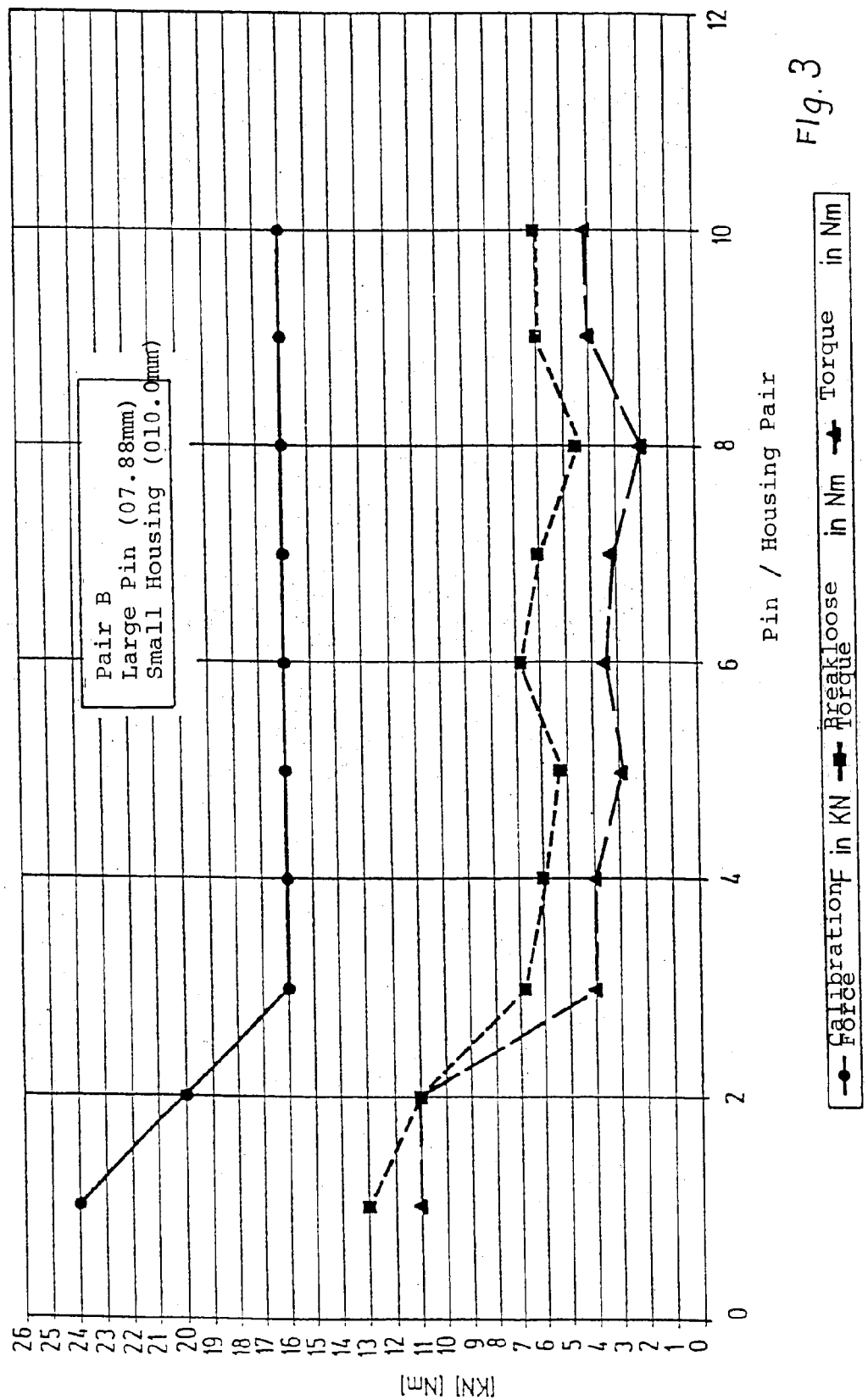
FIG. 3 is a graph corresponding to FIG. 2 with a different geometry for the plain bearing.

FIG. 3 shows a similar graph, where, compared with the measurement in accordance with FIG. 2, slightly larger pins with a diameter of 7.88 mm and a smaller bearing opening of 10.0 mm were used as the pin/housing pair. Applying the same deformation force the results are breakloose torques, or torques, which are higher than those under FIG. 2.

What is claimed is:

1. A plain bearing including a hinge housing having a through bearing opening and a flange bearing bushing pressed into the bearing opening, into which a bearing pin is inserted and received so as to be swivelled, characterized in that a cylindrical bushing of the flange bearing bushing is one of recessed below and flush with the upper surface area of the hinge housing surrounding the bearing opening and in that on the side of the plain bushing opposite a flange bearing bushing collar a washer-shaped axial bearing is provided which lies radially outward against a surface area of the hinge housing surrounding the bearing opening and radially inward against an axial step of the bearing pin, and in that the bearing pin is securely retained against the axial bearing to prevent loss.

2. The plain bearing in accordance with claim 1, wherein the bearing pin has a radially extended collar with a contact surface extended parallel to the flange plane of the flange bearing bushing with which the bearing pin lies against the collar of the flange bearing bushing and secures it against falling out.

3. The plain bearing in accordance with claim 1 wherein a section of the bearing pin extending through the axial bearing is deformed radially outward and clinches the radial inner edge of the axial bearing.

4. The plain bearing in accordance with claim 1 wherein the bearing pin has an anchoring section at one end with which it can be connected to another hinge housing to form a linkage.

5. The plain bearing in accordance with claim 4, wherein the bearing pin can be connected to the other hinge housing to be rotationally immovable.

6. The plain bearing in accordance with claim 1, wherein the cylindrical busing is deformed radially outward and radially inward against the inner wall of the bearing opening and against the surrounding surface of the bearing pin by axially upsetting the front face so that the breakloose torque of the plain bearing lies between 1 and 6 Nm.

7. The plain bearing in accordance with claim 6, wherein the breakloose torque of the plain bearing lies between 2 and 5 Nm.

8. The plain bearing in accordance with claim 7, wherein the breakloose torque of the plain bearing lies between 3 and 5 Nm.

9. The plain bearing in accordance with claim 6, wherein the torque for the plain bearing lies between 0.5 and 4.0 Nm.

10. The plain bearing in accordance with claim 9, wherein the torque for the plain bearing lies between 0.5 and 2.0 Nm.

11. The plain bearing in accordance with claim 1, wherein the breakloose torque of the plain bearing is always more than 0.5 Nm, greater than the resulting torque after breaking loose.

12. The plain bearing in accordance with claim 1, wherein one of the flange bearing bushing and the axial bearing is made from a metal and plastic composite material.

13. The plain bearing in accordance with claim 1, wherein the diameter of the bearing opening is between 1 and 4 mm larger than the baring pin diameter in the case of a bearing pin diameter between 5 and 20 mm.

14. The plain bearing in accordance with claim 13, wherein the diameter of the bearing opening is between 1 and 2.5 mm larger in the case of a bearing pin diameter between 5 and 12 mm.

15. A process for manufacturing a plain bearing including a hinge housing having a bearing opening and a flange bearing bushing pressed into the bearing opening into which a bearing pin is inserted and is received so as to be swivelled, with a predetermined torque required to tighten the bolt, comprising the steps of:

deforming the cylindrical bushing of the flange bearing bushing into the bearing opening radially outward and radially inward against the inner wall of the bearing opening and against the outside surface of the bearing pin by axially upsetting the front face; and depending on the force selected to affect the front face, achieving a breakloose torque for the plain bearing between 1 and 6 Nm.

* * * * *

UNITED STATES PATENT AND TRADEMARK OFFICE
CERTIFICATE OF CORRECTION

PATENT NO. : 6,669,370 B1  Page 1 of 1
DATED : December 30, 2003
INVENTOR(S) : Thomas Storch and Wolfgang Bickle It is certified that error appears in the above-identified patent and that said Letters Patent is hereby corrected as shown below:

<u>Column 6,</u>
Line 28, insert -- The plain bearing in accordance with claim 1, wherein the brakeloose torque of the plain bearing is always more than 1 Nm greater than the resulting torque after breaking loose. --

Signed and Sealed this

Sixth Day of April, 2004

JON W. DUDAS
*Acting Director of the United States Patent and Trademark Office*